United States Patent
Ohta et al.

(10) Patent No.: US 8,829,472 B2
(45) Date of Patent: Sep. 9, 2014

(54) IMAGE DISPLAY DEVICE

(75) Inventors: Masahiko Ohta, Tokyo (JP); Kazuhiko Aoki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/000,122

(22) PCT Filed: Feb. 29, 2012

(86) PCT No.: PCT/JP2012/055028
§ 371 (c)(1),
(2), (4) Date: Aug. 16, 2013

(87) PCT Pub. No.: WO2012/118110
PCT Pub. Date: Sep. 7, 2012

(65) Prior Publication Data
US 2013/0320236 A1    Dec. 5, 2013

(30) Foreign Application Priority Data

Mar. 1, 2011 (JP) .................. 2011-043854

(51) Int. Cl.
| | |
|---|---|
| *G02B 5/12* | (2006.01) |
| *H04N 9/14* | (2006.01) |
| *G09G 3/02* | (2006.01) |
| *H04N 9/31* | (2006.01) |
| *G02B 26/10* | (2006.01) |
| *H04N 9/77* | (2006.01) |

(52) U.S. Cl.
CPC .. *H04N 9/77* (2013.01); *G09G 3/02* (2013.01); *G09G 2360/145* (2013.01); *H04N 9/3135* (2013.01); *G02B 26/101* (2013.01); *G02B 5/12* (2013.01); *H04N 9/14* (2013.01)
USPC ...................... 250/458.1; 348/655

(58) Field of Classification Search
CPC ......... G01N 21/63; G01N 21/64; G02B 5/12; H04N 9/14; H04N 9/77
USPC ...................... 250/354.1, 458.1, 459.1, 483.1; 313/486; 348/655; 382/274
See application file for complete search history.

(56) References Cited

U.S. PATENT DOCUMENTS

| | | |
|---|---|---|
| 7,878,657 B2 | 2/2011 | Hajjar |
| 7,884,816 B2 | 2/2011 | Burroughs et al. |

(Continued)

FOREIGN PATENT DOCUMENTS

| | | |
|---|---|---|
| JP | 54-089525 A | 7/1979 |
| JP | 2001-356272 A | 12/2001 |

(Continued)

OTHER PUBLICATIONS

International Search Report dated May 29, 2012 in PCT/JP2012/055028, with English translation thereof.

*Primary Examiner* — Mark R Gaworecki
(74) *Attorney, Agent, or Firm* — McGinn IP Law Group, PLLC

(57) ABSTRACT

An image display device includes an excitation light source; a fluorescent screen including a plurality of phosphor regions that are repeatedly formed in an in-plane direction and a retro-reflection region that reflects a part of incident light in the opposite direction of the incident light; a scanning unit that scans a surface of fluorescent screen on which the phosphor regions and the retro-reflection region are formed with excitation light from the excitation light source; a photo detection unit that outputs signal value that varies on the basis of an incident light amount onto the photo detection unit; a reflection unit that reflects retro-reflection light of the excitation light directed from the retro-reflection region to the photo detection unit; and a control unit that causes the scanning unit to scan the fluorescent screen, detects boundaries between the phosphor regions and the retro-reflection region on the fluorescent screen.

27 Claims, 11 Drawing Sheets

(56) References Cited

U.S. PATENT DOCUMENTS

| | | |
|---|---|---|
| 2002/0036824 A1 | 3/2002 | Sasaki |
| 2007/0187616 A1 | 8/2007 | Burroughs et al. |
| 2009/0001272 A1 | 1/2009 | Hajjar |

FOREIGN PATENT DOCUMENTS

| | | |
|---|---|---|
| JP | 2009-537868 A | 10/2009 |
| JP | 2009-539120 A | 11/2009 |
| JP | 2010-533307 A | 10/2010 |
| WO | WO 2007/095329 A2 | 8/2007 |
| WO | WO 2007/134329 A2 | 11/2007 |
| WO | WO 2009/003192 A1 | 12/2008 |

Extension member 33
Support member 34
31 Extension member

6 Fluorescent screen
Scan track 1a
Retro-reflection light 7
Reflection means 3
Scanning means 4
8 Condenser lens
2 Photo detection means
5 Excitation light source
3a Opening
1 Control means

IMAGE DISPLAY DEVICE

TECHNICAL FIELD

The present invention relates to an image display device that scans a fluorescent screen with excitation light, the fluorescent screen having stripe-shaped or matrix-shaped regions in which phosphors are formed.

BACKGROUND ART

An image display device that includes: a fluorescent screen in which stripe-shaped regions, in which phosphors that are excited by light to emit fluorescent light are formed, are repeatedly formed in the in-plane direction; and a scanning system that scans the fluorescent screen with excitation light is known. Phosphors include a phosphor that emits red fluorescent light, a phosphor that emits green fluorescent light, and a phosphor that emits blue fluorescent light. These color phosphor regions are repeatedly formed in a predetermined order on the fluorescent screen.

Generally, in an image display device of this type, the relative positional relationship between the scanning system and fluorescent screen typically undergoes change due to various causes such as vibrations or distortion, changes in the environment such as in temperature or humidity, the effect of gravity, or changes that occur with the passage of time. In addition, if the scanning system is a resonance mirror or the like, the temperature of the resonance mirror that reflects excitation light that has been intensity-modulated varies depending on the intensity of the excitation light. As a result, the resonance frequency of the resonance mirror also varies. If the resonance frequency of the resonance mirror varies, the phase and amplitude of the scanning system vary and thus the scanning position deviates from the correct position.

If a static variation and a dynamic variation such as variation of the relative positional relationship between the scanning system and the phosphor screen or a variation of the scanning position occurs, stripe-shaped or matrix-shaped color phosphor regions cannot be irradiated with the excitation light at an appropriate timing. As a result, the luminance of fluorescent light which the individual color phosphor regions emit vary and it causes deterioration of color purity of a displayed image.

To solve such a problem, the positions of the individual color phosphor regions on the fluorescent screen need to be accurately detected and the individual color phosphor regions need to be irradiated with excitation light at an appropriate timing.

Patent Literature 1 describes an image display device that can control the irradiation timing at which phosphor regions are irradiated with excitation light.

The image display device described in Patent Literature 1 has a light source, a fluorescent screen, a deflection unit that scans the fluorescent screen with excitation light emitted from the light source, a half mirror located in the traveling direction of the excitation light directed from the deflection device, a photo detector, and a drive circuit that controls the light emission timing at which the light source emits light based on the output signal of the photo detector.

The fluorescent screen has individual color (red, green, and blue) stripe-shaped visible fluorescent phosphors that are repeatedly formed at predetermined intervals in the in-plane direction and stripe-shaped dark lanes formed adjacent to individual visible fluorescent phosphors. Stripe-shaped reflection means made of a cube mirror is formed at every second dark lane. The reflection means reflects incident light in the opposite direction of the direction of the incident light.

The fluorescent screen is irradiated with the excitation light directed from the deflection unit through the half mirror. The light emission timing is controlled in such a manner that the fluorescent screen is scanned with a predetermined quantity of excitation light. When the fluorescent screen is scanned, the individual color visible fluorescent phosphors and the reflection means are irradiated with the excitation light. The excitation light with which the reflection means is irradiated becomes retro-reflection light that travels in the opposite direction of the direction of the incident light. The retro-reflection light reaches the half mirror. Part of the retro-reflection light reflects on the half mirror and then enters the photo detector.

The output signal of the photo detector is supplied to the drive circuit as an index signal that serves to detect the positions of the individual visible fluorescent phosphors. The drive circuit predicts the positions of the individual color visible fluorescent phosphors based on the output signal of the photo detector and controls the light emission timing of the light source such that the visible fluorescent phosphors are irradiated with the excitation light at an appropriate timing.

RELATED ART LITERATURE

Patent Literature

Patent Literature 1: JP54-89525A, Publication (FIG. 1)

DISCLOSURE OF THE INVENTION

In the image display device described in Patent Literature 1, the fluorescent screen is irradiated with excitation light directed from the deflection unit through the half mirror. In this case, since the half mirror only transmits nearly half of the incident light, the intensity of the excitation light with which the fluorescent screen is irradiated becomes lower. Thus, the intensities of fluorescent light emitted from the individual color visible fluorescent phosphors become lower and thereby the luminance of the displayed image becomes lower.

In the image display device described in Patent Literature 1, the half mirror may be removed and the photo detector may be located to face the fluorescent screen such that the photo detector directly detects the retro-reflection light from individual reflection means that are repeatedly formed. In this modification example, since a half mirror is not used, the luminance of a displayed image does not become lower. However, this modification example will have the following problem.

The photo detector is located to face an off-center position (for example, left or right end) of the fluorescent screen such that the photo detector does not disturb excitation light with which the fluorescent screen is scanned. In this case, with respect to retro-reflection light from the reflection means on the fluorescent screen, the ratio of retro-reflection light that enters the photo detector decreases proportionally to increases in the distance between the photo detector and the reflection means. Thus, if the reflection means is located apart from the photo detector, the photo detector may not sufficiently obtain the intensity of the retro-reflection light directed from the reflection means. As a result, the image display device may not accurately detect the positions of the visible fluorescent phosphors.

When the fluorescent screen is scanned with a predetermined quantity of excitation light, the intensity of the retro-reflection light that enters the photo detector gradually varies corresponding to the distance between the reflection means and the photo detector. Generally, the more the intensity of the incident light of the retro-reflection light varies, the more the dynamic range of the photo detector needs to be increased.

In the above-mentioned modification example, since the photo detector is located at an off-center position of the screen, the intensity of retro-reflection light that enters the photo detector deviates corresponding to the scanning position on the screen. Thus, the variation of the intensity of retro-reflection light that enters the photo detector largely depends on the scanning position on the screen. Consequently, the photo detector needs to be a photoreceptor having a large dynamic range. However, since a photoreceptor having a large dynamic range is expensive, the cost of the image display device will increase.

In addition, although, in the visible fluorescent phosphor regions that are formed between each reflection means, the visible fluorescent phosphors are excited to emit visible light, part of the visible light enters the photo detector as noise light. In addition, part of excitation light reflects and diffuses on the front surfaces of the phosphors. Part of the reflection and diffusion components of the excitation light may enter the photo detector as noise light. Thus, not only retro-reflection light directed from the reflection means, but also visible luminescence from the visible fluorescent phosphor regions and the reflection and diffusion components of excitation light that occur on the front surfaces of the phosphor regions enter the photo detector. Consequently, the photo detector outputs a signal in which a detection signal of luminescence from the visible fluorescent phosphor regions that is noise is superimposed on a detection signal of retro-reflection light from the reflection means.

Like the case of retro-reflection light directed from the reflection means, with respect to reflection and diffusion light from the visible fluorescent phosphor regions, the ratio of reflection and diffusion light that enters the photo detector decreases proportionally to increases in the distance between the photo detector and the visible fluorescent phosphor regions. Thus, if the fluorescent screen is scanned with a predetermined quantity of excitation light, the reception level corresponding to the offset superimposed on the detection signal of the retro-reflection light directed from the reflection means gradually varies corresponding to the distance between the photo detector and the visible fluorescent phosphor regions. The offset varies in synchronization with the horizontal scanning on the screen.

In the above-mentioned modification example, since the offset largely varies, the S/N ratio becomes small. As a result, the detection accuracy of excitation light by the photo detector becomes lower and thereby it becomes difficult to irradiate the visible fluorescent phosphors with the excitation light at an appropriate timing.

Moreover, in the above-mentioned modification example, the larger the dynamic range of the photo detector varies, the larger the offset needs to become. Thus, the photo detector needs to be a photoreceptor having a much larger dynamic range. As a result, the cost of the image display device will further increase.

An object of the present invention is to provide an image display device that can solve the above-mentioned problems and that can irradiate phosphors with excitation light at an appropriate timing without a decrease in the luminance of a displayed image.

To achieve the above-mentioned object, an image display device according to the present invention includes:

an excitation light source;

a fluorescent screen that includes a plurality of phosphor regions which are repeatedly formed in an in-plane direction and a retro-reflection region that reflects a part of light that enters the retro-reflection region in a direction opposite to a direction of the light;

scanning means that scans a surface of the fluorescent screen on which the phosphor regions and the retro-reflection region are formed with excitation light emitted from the excitation light source;

photo detection means that outputs a signal value that varies on the basis of a quantity of light that enters the photo detection means;

reflection means that reflects retro-reflection light of the excitation light directed from the retro-reflection region to the photo detection means; and control means that causes the scanning means to scan the fluorescent screen, detects boundaries between the phosphor regions and the retro-reflection region on the fluorescent screen based on the output signal of the photo detection means, and controls a light emission timing of the excitation light source based on the detected boundaries, wherein the reflection means surrounds or sandwiches a region through which the excitation light passes when the reflection means is viewed from the fluorescent screen side along an optical path of the excitation light.

DESCRIPTION OF REFERENCE NUMERALS

Figure 1:
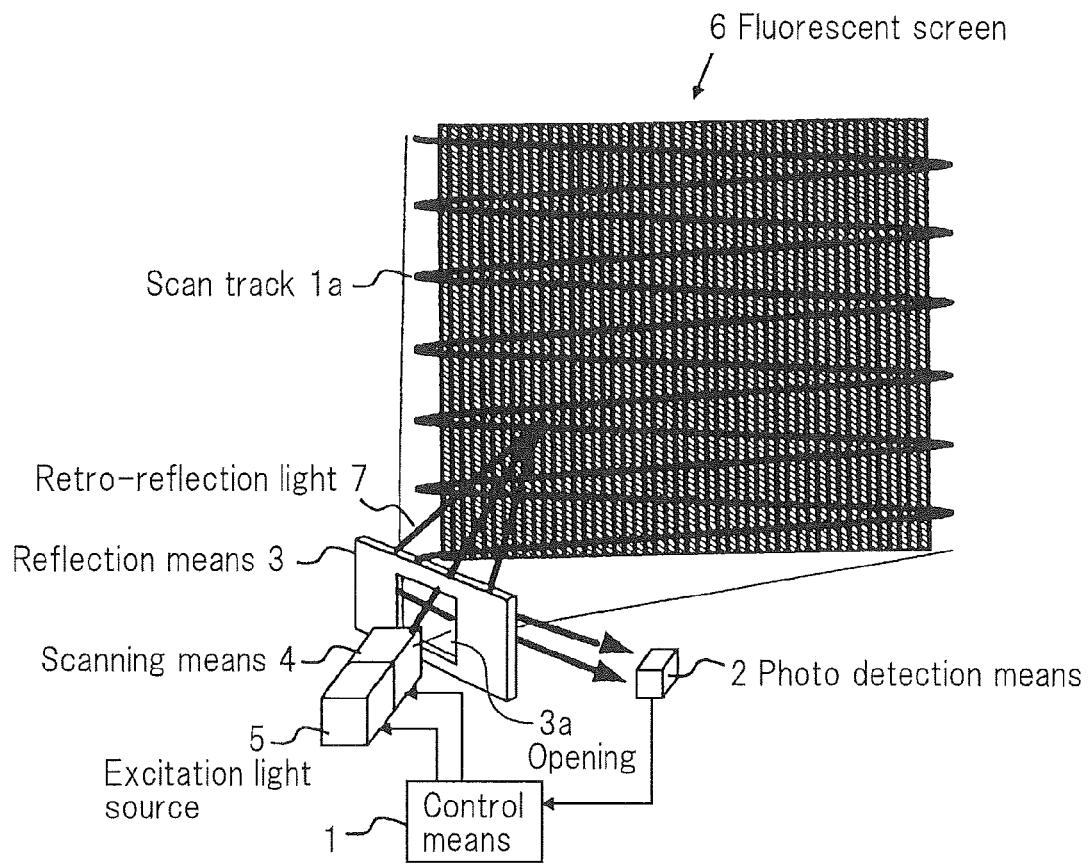
[FIG. 1] is a block diagram showing the structure of an image display device according to a first exemplary embodiment of the present invention.

1 Control means
1a Scan track
2 Photo detection means
3 Reflection means
3a Opening
4 Scanning means
5 Excitation light source
6 Fluorescent screen
7 Retro-reflection light
Exemplary Embodiment Next, with reference to the accompanying drawings, exemplary embodiments of the present invention will be described.

(First Exemplary Embodiment)

FIG. 1 is a block diagram showing the structure of an image display device according to a first exemplary embodiment of the present invention.

Referring to FIG. 1, the image display device includes control means 1, photo detection means 2, reflection means 3, scanning means 4, excitation light source 5, and fluorescent screen 6.

Excitation light source 5 outputs excitation light (for example, ultraviolet light or blue light) that excites phosphors formed on fluorescent screen 6. Excitation light source 5 is, for example, a laser light source that is typified by a laser diode (LD).

Fluorescent screen 6 includes a plurality of phosphor regions repeatedly formed in the in-plane direction, the regions between each phosphor region being retro-reflection regions that return incident light in the opposite direction of the direction of the incident light.

Figure 2:
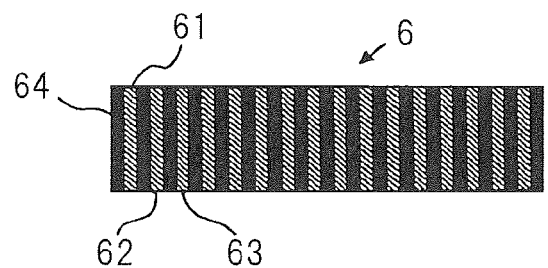
[FIG. 2] is a schematic diagram showing part of a fluorescent screen of the image display device shown in FIG. 1.

FIG. 2 shows a specific structure of part of fluorescent screen 6. As shown in FIG. 2, fluorescent screen 6 includes a plurality of phosphor regions 61 to 63 that are partitioned by retro-reflective black stripes 64 that are retro-reflective regions.

Phosphor regions 61 are regions on which a phosphor that emits, for example, red fluorescent light is formed. Phosphor regions 62 are regions on which a phosphor that emits, for example, green fluorescent light is formed. Phosphor regions 63 are regions in which a phosphor that emits, for example, blue fluorescent light is formed. In the example shown in FIG. 2, phosphor regions 61, 62, and 63 are successively and repeatedly formed in that order in a predetermined direction. If excitation light source 5 is a light source that outputs blue light, phosphor regions 63 may be replaced with a diffusion layer that diffuses blue light.

Figure 3A:
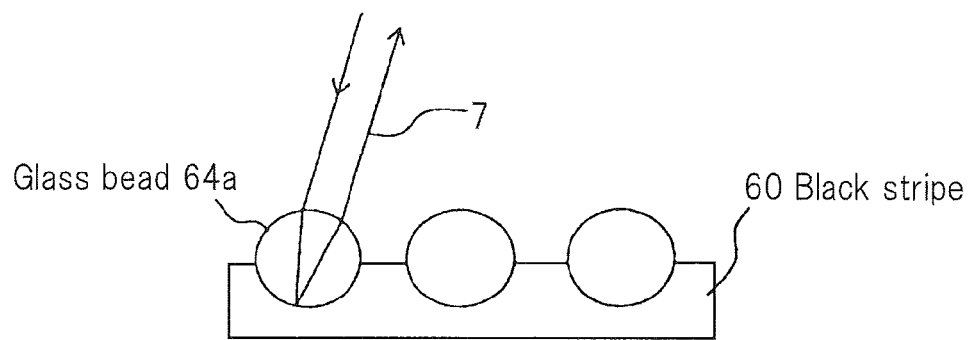
[FIG. 3A] is a schematic diagram showing an example of a retro-reflective black stripe shown in FIG. 2.

FIG. 3A shows an example of retro-reflective black stripe 64.

Referring to FIG. 3A, retro-reflective black stripe 64 has a structure in which a plurality of glass beads 64a are formed on black stripe 60. Glass bead 64a is spherical and an approximately hemispherical portion of glass bead 64a is embedded in the surface of black stripe 60. The remaining hemispherical portion of glass bead 64a is exposed from the surface of black stripe 60.

When a spot of excitation light emitted from excitation light source 5 passes over black stripe 60, the excitation light enters the exposed surface of glass bead 64a. The light that was entered is refracted at the obverse-side interface (the boundary between the surface of glass bead 64a and air). Light that was entered into glass bead 64a is reflected at the interface between glass bead 64a and black stripe 60 and the reflection light exits from the obverse-side interface. When the reflection light passes through the obverse-side interface, the reflection light is refracted and travels, as retro-reflection light 7, in the direction opposite that of the light that was entered.

Black stripe 60 may contain, for example, a reflective material so as to cause light that enters glass bead 64a to reflect at the interface between glass bead 64a and black stripe 60. Alternatively, part or all of the sphere of glass bead 64a may be coated with a Semi-transmissive and semi-reflective film.

If glass bead 64a is designed to focus light on one point of the interface between glass bead 64a and black stripe 60, it is ensured that retro-reflection light 7 travels in the direction opposite that of the incident light.

Such a retro-reflection region (retro-reflective black stripes 64) composed of glass beads 64a can be formed by using a screen printing technique.

Figure 3B:
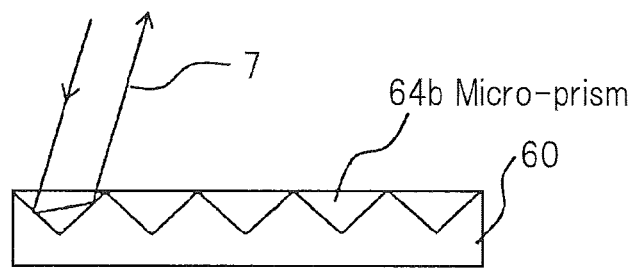
[FIG. 3B] is a schematic diagram showing another example of a retro-reflective black stripe shown in FIG. 2.

FIG. 3B shows another example of retro-reflective black stripes 64.

Referring to FIG. 3B, retro-reflective black stripes 64 have a structure in which micro-prisms 64 are uniformly formed on black stripe 60. Micro-prisms 64b are a plurality of prisms, each prism having a triangular section. The vertex angle of each prism is 90°. Micro-prisms 64b are formed in such a manner that the vertex side of each prism is buried in black stripe 60 and the bottom portion of each prism forms a flat surface (incident and exit surface).

When a spot of excitation light emitted from excitation light source 5 passes over black stripe 60, the excitation light enters the incident and exit surface of micro-prism 64b. A reflection film is formed on each of two surfaces that form the vertex of micro-prism 64b. Light that enters micro-prism 64b reflects on one of the two surfaces that form the vertex and then reflects on the other surface. The reflection light that reflects on the other surface exits from the incident and exit surface. The exit light that exits from the incident and exit surface becomes retro-reflection light 7 and travels in the direction opposite that of the incident light.

The retro-reflection regions of micro-prisms 64b shown in FIG. 3B have a high retro-reflection ratio compared to that of retro-reflection regions of glass beads 64a shown in FIG. 3A.

Referring to FIG. 1 again, scanning means 4 scans fluorescent screen 6 with excitation light emitted from excitation light source 5 as denoted by wave-shaped scan track 1a.

Scanning means 4 is composed, for example, of a polygon mirror, a galvanometer mirror, or an MEMS (Micro Electro Mechanical Systems) mirror.

Scanning means 4 may be a biaxial scanning element capable of scanning in both the horizontal and vertical directions, or may be a construction in which two elements, a scanning element that scans in the horizontal direction and a scanning element that scans in the vertical direction, are combined. Scan track 1a denotes that fluorescent screen 6 is scanned in the horizontal direction with excitation light and the scanning direction of fluorescent screen 6 is inverted at the left and right ends. Two-dimensional scanning of fluorescent screen 6 can be realized by scanning in the vertical direction at the same time as this scanning in the horizontal direction.

Reflection means 3 reflects retro-reflection light 7 directed from the retro-reflection regions (retro-reflective black stripes 64) toward photo detection means 2. Square opening 3a is formed at the center of reflection means 3 so as to cause excitation light to pass through scanning means 4.

Photo detection means 2 is composed of a filter that transmits only excitation light and a photodiode. Retro-reflection light 7 reflected by retro-reflective black stripes 64 enters photo detection means 2 through reflection means 3. An output signal of photo detection means 2 is supplied to control means 1. Since the size of the photodiode is not restricted regardless of where it is located, the photodiode that has a large light reception surface can be used. The filter that transmits only excitation light may be freely located between the screen and the photodiode. If the quantity of light other than excitation light that enters the photodiode is small and the excitation light can be sufficiently detected, the filter that transmits only excitation light may be omitted.

Control means 1 detects the boundaries between phosphor regions 61, 62, and 63 and retro-reflective black stripes 64 based on the output signal of photo detection means 2, identifies the positions of phosphor regions 61, 62, and 63 based on the detected boundaries, and controls the light emission timing of excitation light source 5.

The boundaries between phosphor regions 61, 62, and 63 and retro-reflective black stripes 64 can be obtained based on, for example, the timing at which the output signal level of photo detection means 2 becomes higher than a predetermined threshold and the timing at which the output signal level becomes lower than the predetermined threshold. The timing at which the output signal level becomes higher than the threshold corresponds to the timing at which a spot of excitation light passes over a boundary between the phosphor region and retro-reflective black stripe 64 on fluorescent screen 6 when the spot moves from the phosphor region to retro-reflective black stripe 64. On the other hand, the timing at which the output signal level becomes lower than the threshold corresponds to the timing at which a spot of excitation light passes over the boundary between retro-reflective black stripes 64 and a phosphor region on fluorescent screen 6 when the spot moves from retro-reflective black stripe 64 to the phosphor region.

Next, the operation of the light emission timing control of the image display device according to this embodiment will be described.

Figure 4:
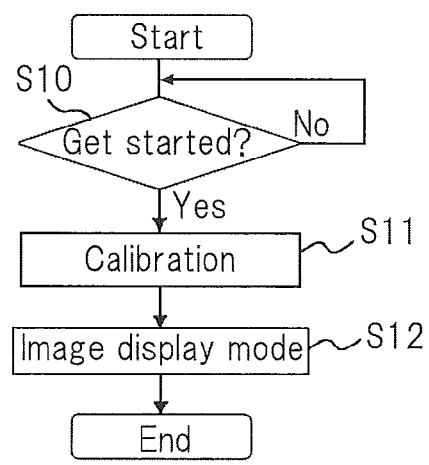
[FIG. 4] is a flow chart showing a procedure of a light emission timing control performed by the image display device shown in FIG. 1.

FIG. 4 is a flow chart showing a procedure of the light emission timing control.

Control means 1 determines whether or not the image display device gets started (at step S10). The image display device is provided with a power button (not shown). Control means 1 performs the determination of step S10 depending on whether or not the button has been pressed.

When the image display device gets started, control means 1 executes a calibration operation (at step S11). Control means 1 executes the calibration operation in the following manner.

Control means 1 causes excitation light source 5 to continuously output a predetermined quantity of excitation light for a predetermined period of time and scanning means 4 to scan fluorescent screen 6 with the excitation light. The predetermined period of time corresponds to, for example, one frame.

While scanning means 4 is scanning fluorescent screen 6, control means 1 detects the boundaries between phosphor regions 61, 62, and 63 and retro-reflective black stripes 64 on fluorescent screen 6 based on the output signal of photo detection means 2. Control means 1 generates and holds boundary position data (initial value) based on the detected result.

In the foregoing calibration operation, scanning means 4 may scan fluorescent screen 6 for one frame and control means 1 may generate boundary position data. Alternatively, scanning means 4 may scan fluorescent screen 6 for a plurality of frames and control means 1 may generate boundary position data for individual frames and average the boundary position data for the plurality of frames.

After executing the calibration operation, an image display mode that displays an image based on an input image signal is set. In the image display mode, control means 1 controls both the light emission timing of excitation light source 5 and the scanning operation of scanning means 4 to display an image based on the input image signal on fluorescent screen 6.

In the image display mode, when the image display device displays a first image based on image data of a first input frame, control means 1 controls the light emission timing of excitation light source 5 based on the boundary position data obtained in the calibration operation. While control means 1 is executing a display process for the first image, control means 1 detects the boundaries between phosphor regions 61, 62, and 63 and retro-reflective black stripes 64 on fluorescent screen 6 based on the output signal of photo detection means 2 and updates the boundary position data based on the detected result.

When the image display device displays an image corresponding to image data of a second or later input frame, control means 1 controls the light emission timing of excitation light source 5 based on the boundary position data that has been updated in the proceeding image display process. While control means 1 is executing the display process for the current image, control means 1 detects the boundaries between phosphor regions 61, 62, and 63 and retro-reflective black stripes 64 on fluorescent screen 6 based on the output signal of photo detection means 2 and updates the boundary position data based on the detected result. Control means 1 uses the updated boundary position data when the image display device displays the next image.

The foregoing boundary position data are updated frame by frame. Alternatively, boundary position data may be updated every several frames.

In the procedure of the light emission timing control shown in FIG. 4, the calibration operation is performed after the image display device gets started. Alternatively, the calibration operation may be performed after another mode in which an image is not displayed, for example when the device is restored from the pause mode.

In the image display device according to this embodiment, while fluorescent screen 6 is being scanned with excitation light emitted from excitation light source 5 and an image is being displayed, the boundaries between phosphor regions 61, 62, and 63 and retro-reflective black stripes 64 are detected and the light emission timing of excitation light source 5 is controlled based on the detected boundaries so as to scan fluorescent screen 6 next time (display an image for the next input frame). As a result, phosphor regions 61, 62, and 63 can be irradiated with excitation light at an optimum timing. Thus, since excitation light is prevented from improperly entering phosphors, an image having high color purity can be provided.

In addition, since excitation light directed from scanning means 4 just passes through opening 3a of reflection means 3, the intensity of excitation light with which fluorescent screen 6 is irradiated is not decreased by reflection means 3. Thus, in the image display device according to this embodiment, the intensity of excitation light with which fluorescent screen 6 is irradiated is high compared to the image display device that uses a half mirror, which is described in Patent Literature 1. Thus, the image display device according to this embodiment can provide a high luminance and bright image.

When fluorescent screen 6 is scanned with excitation light directed from scanning means 4, the incident excitation light retro-reflects on retro-reflective black stripes 64. The retro-reflection light directed from retro-reflective black stripes 64 returns to the portion to which scanning means 4 directs the excitation light while the radius of the retro-reflection light is widening for several mm to several cm. Reflection means 3 is located in such a manner that reflection means 3 surrounds the portion to which scanning means 4 directs the excitation light. Part of retro-reflection light directed from retro-reflective black stripes 64 reflects on reflection means 3 and then enters photo detection means 2.

In the foregoing case, the amplitude of the intensity of retro-reflection light that is directed from retro-reflective black stripes 64 and then enters photo detection means 2 through reflection means 3 (hereinafter, this amplitude is referred to as the signal intensity) becomes large compared to that of the structure in which the photo detector is located at an off-center position of the fluorescent screen (the modification example of the image display device described in Patent Literature 1). In addition, the value of the offset, which varies corresponding to the scanning position on fluorescent screen 6, with respect to the intensity of retro-reflection light that is directed from retro-reflective black stripes 64 and that then enters photo detection means 2 through reflection means 3, is smaller than that of the modification example of the image display device described in Patent Literature 1. Thus, since the detected signal intensity of the retro-reflection light becomes large and the value of the offset that varies corresponding to the scanning position on fluorescent screen 6 becomes small, the S/N ratio increases and thereby the output signal of photo detection means 2 has a sufficient signal level. As a result, the boundaries between phosphor regions 61, 62, and 63 and retro-reflective black stripes 64 can be accurately detected.

In addition, since the intensity of retro-reflection light that enters photo detection means 2 does not largely vary corresponding to the scanning position on fluorescent screen 6, a photoreceptor having a small dynamic range can be used for photo detection means 2.

When fluorescent screen 6 is scanned with excitation light directed from scanning means 4, part of excitation light that enters phosphor regions 61, 62, and 63 reflects and diffuses on the front surfaces of phosphors. Part of reflection and diffusion components of the excitation light becomes noise and enters photo detection means 2. The spread angle of the reflection and diffusion components of the excitation light is sufficiently larger than that of the retro-reflection light directed from retro-reflective black stripes 64. Part of reflection light of excitation light directed from phosphor regions 61, 62, and 63 reflects on reflection means 3 and then enters photo detection means 2.

In the foregoing structure, with respect to the reflection and diffusion light components of excitation light that is emitted from the phosphor regions, the ratio of reflection and diffusion light that enters photo detection means 2 varies corresponding to the scanning position on fluorescent screen 6. However, the variation of the offset varies little compared to that of the modification example of the image display device described in Patent Literature 1. Thus, since the offset varies little, the S/N ratio improves and the detection accuracy of boundaries between phosphor regions 61, 62, and 63 and retro-reflective black stripes 64 becomes high.

In addition, since the offset varies little, a photoreceptor having a much smaller dynamic range can be used for photo detection means 2.

Figure 5:
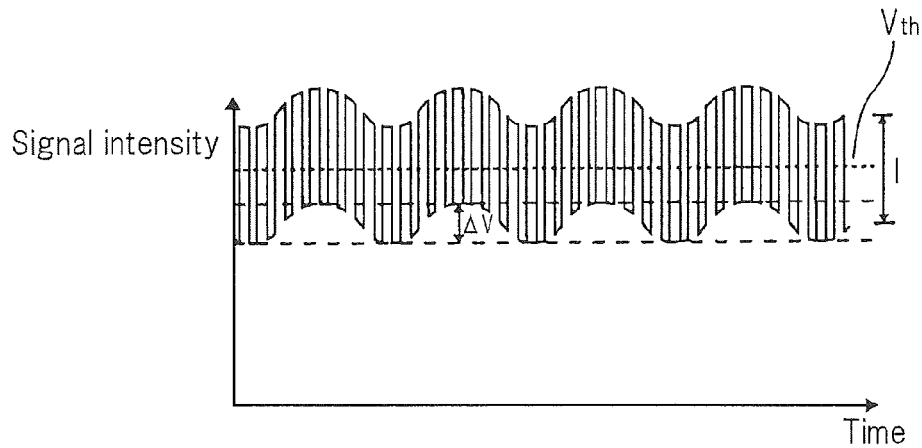
[FIG. 5] is a waveform diagram showing an example of an output signal of photo detection means in the case in which the fluorescent screen is scanned in the horizontal direction with excitation light in the image display device shown in FIG. 1.
Figure 6:
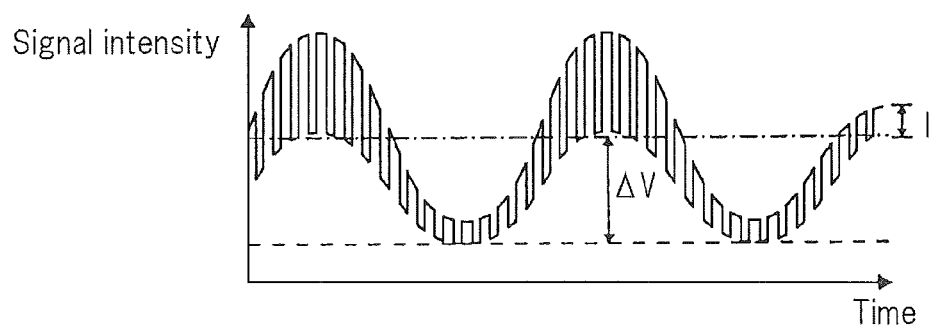
[FIG. 6] is a waveform diagram showing an example of an output signal of the photo detection means in the case in which a fluorescent screen is scanned in the horizontal direction with excitation light in an image display device according to a comparative example.

FIG. 5 shows an example of the output signal of the photo detection means in the case in which the fluorescent screen is scanned in the horizontal direction with a predetermined quantity of excitation light in the image display device according to this embodiment. FIG. 6 shows an example of the output signal of the photo detection means in the case in which the fluorescent screen is scanned in the horizontal direction with the predetermined quantity of excitation light in the image display device according to the comparative example. In FIG. 5 and FIG. 6, the vertical axis represents the signal intensity, whereas the horizontal axis represents the time.

The structure of the image display device according to the comparative example is different from the structure shown in FIG. 1 in which reflection means 3 is omitted and when photo detection means 2 is viewed from the direction perpendicular to fluorescent screen 6, photo detection means 2 is located at an off-center position, specifically in the neighborhood of the right end or left end of fluorescent screen 6. FIG. 6 shows the signal obtained by photo detection means 2.

In the comparative example, since photo detection means 2 is located to face an off-center position of fluorescent screen 6, the signal intensity I of retro-reflection light directed from retro-reflective black stripes 64 largely varies corresponding to the scanning position on fluorescent screen 6 and also the offset Δ largely varies corresponding to the scanning position on fluorescent screen 6. The signal intensity I and the offset Δ vary in synchronization with the period of scanning means 4.

In contrast, in the image display device according to this embodiment, when reflection means 3 is viewed from the direction perpendicular to fluorescent screen 6, reflection means 3 is located nearly at the center of fluorescent screen 6 and reflects part of retro-reflection light directed from fluorescent screen 6 toward photo detection means 2. The retro-reflection light directed from reflection means 3 is received by photo detection means 2. FIG. 5 shows the signal obtained by photo detection means 2.

In this case, signal intensity I of the retro-reflection light directed from each retro-reflective black stripe 64 is sufficiently large as shown in FIG. 5. The value of signal intensity I that varies in synchronization with the horizontal scanning on fluorescent screen 6 is sufficiently smaller than that of the comparative example. Although offset ΔV varies corresponding to the scanning position on fluorescent screen 6, offset ΔV varies little compared to that of the comparative example.

Signal intensity I and offset ΔV shown in FIG. 5 periodically and synchronously vary. When a spot of excitation light passes over a fluorescent region nearly at the center of the fluorescent screen, offset ΔV becomes the maximum value, whereas signal intensity I becomes the minimum value. The periods of these signal intensity I and offset ΔV that vary are nearly half of those of signal intensity I and offset ΔV shown in FIG. 6.

In FIG. 5, threshold Vth denoted by a dotted line is a threshold based on which retro-reflection light directed from retro-reflective black stripes 64 is detected. The boundaries between retro-reflective black stripes 64 and phosphor regions (61 to 63) are detected based both on a timing at which the level of the output signal of photo detection means 2 becomes higher than threshold Vth and a timing at which the level of the output signal becomes lower than threshold Vth.

In the image display device according to this embodiment, as long as photo detection means 2 does not shade excitation light emitted from excitation light source 5 and can detect retro-reflection light directed from retro-reflective black stripes 64, photo detection means 2 may be located at any position.

Moreover, in the image display device according to this embodiment, the shape and position of reflection means 3 may be changed as follows.

Figure 7:
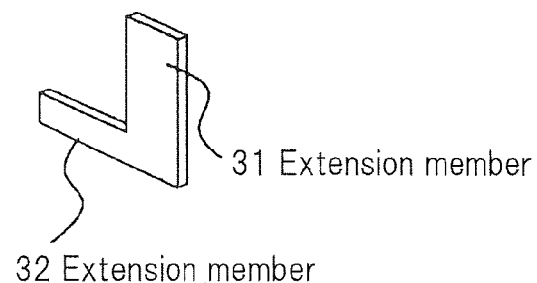
[FIG. 7] is a schematic diagram showing a modification example of the reflection means of the image display device shown in FIG. 1.

FIG. 7 is a schematic diagram showing a modification of reflection means 3.

Reflection means 3 shown in FIG. 7, which is L-letter shaped, is composed of extension member 31 that extends in a first direction and extension member 32 that extends in a second direction that is orthogonal to the first direction. When L-letter shaped reflection means 3 is viewed from the fluorescent screen 6 side along an optical path of excitation light, reflection means 3 is located such that the longitudinal direction (first direction) of extension member 31 intersects with or is orthogonal to the horizontal scanning direction of scanning means 4.

Extension member 31 and extension member 32 may be separately provided. In this case, the position of extension member 31 may be different from the position of extension member 32. As a result, the degree of freedom of the position of reflection means 3 improves. However, when reflection means 3 is viewed from fluorescent screen 6 side along the optical path of excitation light, extension member 31 extends in the direction that intersects with or is orthogonal to the horizontal scanning direction, whereas extension member 32 extends in the horizontal scanning direction.

Figure 8:
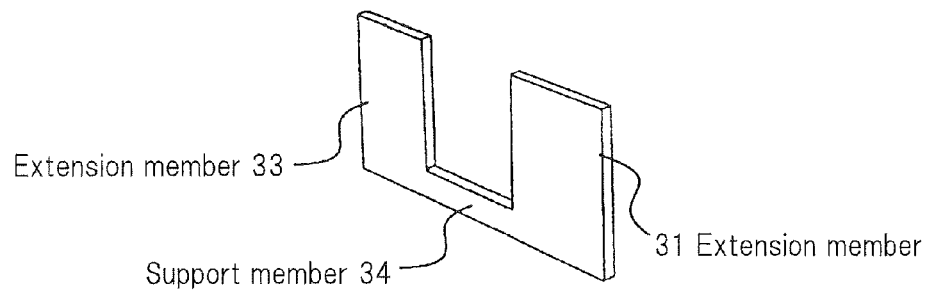
[FIG. 8] is a schematic diagram showing another modification example of the reflection means of the image display device shown in FIG. 1.

FIG. 8 schematically shows another modification example of reflection means 3.

Reflection means 3 shown in FIG. 8, which is C-letter shaped, is composed of extension members 31 and 33 and support member 34 that horizontally holds extension members 31 and 32. When C-letter shaped reflection means 3 is viewed from fluorescent screen 6 side along the optical path of excitation light, the longitudinal direction of extension members 31 and 33 intersects with or is orthogonal to the horizontal scanning direction of scanning means 4.

In the example shown in FIG. 8, since extension members 31 and 33 are located in the horizontal scanning direction, the offset of the horizontal scanning varies little compared to that of the example shown in FIG. 7. Thus, the detection accuracy of retro-reflection light directed from retro-reflective black stripes 64 can be improved and a photoreceptor having a much smaller dynamic range can be used for photo detection means 2.

In the example shown in FIG. 8, extension member 31 and extension member 33 may be separately provided. In this case, the position of extension member 31 may be different from the position of extension member 33. As a result, the degree of freedom of the position of reflection means 3 improves. However, when reflection means 3 is viewed from fluorescent screen 6 side along the optical path of excitation light, extension members 31 and 33 extend in the direction that intersects with or is orthogonal to the horizontal scanning direction.

Alternatively, extension member 31 and extension member 33 may be located with an angle rather than in parallel. As long as extension member 31 and extension member 33 are located with an angle where retro-reflection light reflects in the direction of photo detection means 2, the quantity or area of photo detection means 2 can be decreased.

(Second Exemplary Embodiment)

Figure 9:
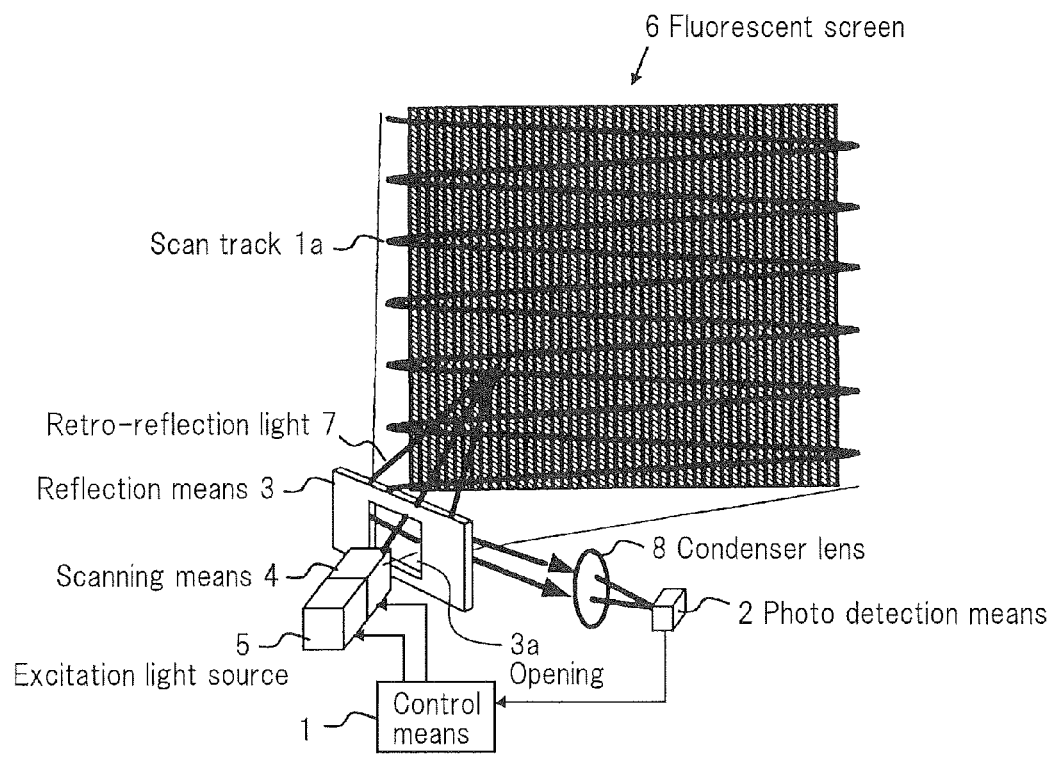
[FIG. 9] is a block diagram showing the structure of an image display device according to a second exemplary embodiment of the present invention.

FIG. 9 is a block diagram showing the structure of an image display device according to a second exemplary embodiment of the present invention.

The structure of the image display device according to the second exemplary embodiment is the same as the structure of the image display device according to the first exemplary embodiment except that condenser lens 3 is located to face the light reception surface of photo detection means 2.

Besides the effect described in the first exemplary embodiment, the image display device according to the second exemplary embodiment can have the following effect.

Part of retro-reflection light (diffusion light) directed from retro-reflective black stripes 64 reflects on reflection means 3 and then enters the light reception surface of photo detection means 2 through condenser lens 8. In this structure, since light retro-reflection light that enters the light reception surface of photo detection means 2 is condensed by condenser lens 8, the size of the light reception surface can be decreased and thereby photo detection means 2 can be miniaturized.

The smaller the light reception surface of a photoreceptor such as a photodiode, the higher the response speed becomes. Thus, when the size of the light reception surface of photo detection means 2 is decreased, the response speed of photo detection means 2 can be improved and thereby the light emission timing control can be speeded up. In addition, the smaller the area of the light reception surface, the more inexpensive the cost of the photoreceptor becomes. Thus, the cost of the image display device can be reduced.

When retro-reflection light (diffusion light) is condensed by condenser lens 8, more retro-reflection light (diffusion light) can enter photo detection means 2. As a result, the signal intensity of photo detection means 2 increases and thereby the detection accuracy of the boundaries between retro-reflective black stripes 64 and phosphor regions improves.

Next, the size of reflection means 3 will be specifically described.

Figure 10:
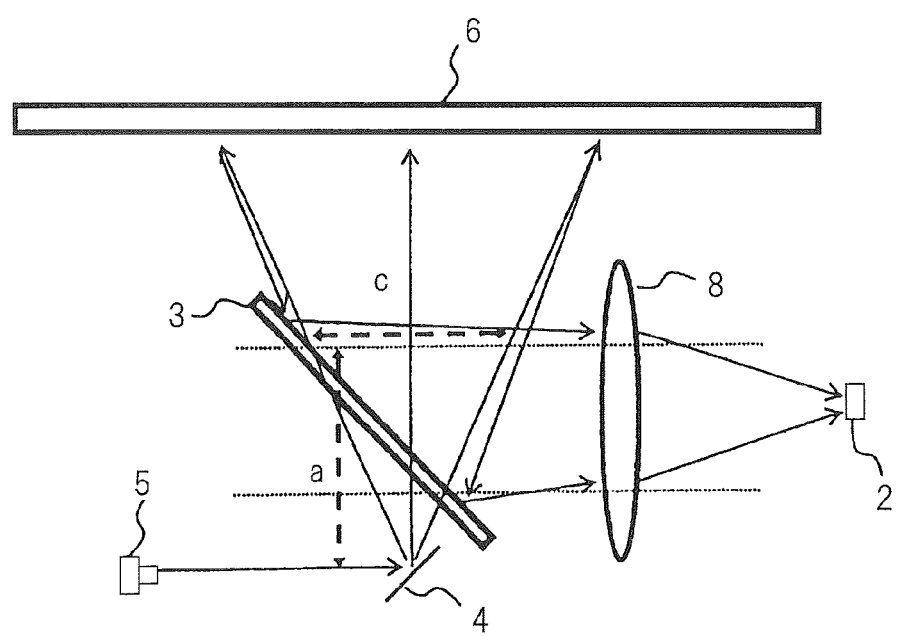
[FIG. 10] is a schematic diagram describing the size of reflection means of the image display device shown in FIG. 9.

FIG. 10 is a schematic diagram describing the size of reflection means 3.

Reflection means 3 is located between scanning means 4 and fluorescent screen 6. For example, excitation light that passes through the center (center of gravity) of opening 3a of reflection means 3 enters the scanning surface of fluorescent screen 6 such that the excitation light is orthogonal to the scanning surface of fluorescent screen 6. When fluorescent screen 6 and reflection means 3 are viewed from the direction perpendicular to the surface orthogonal both to the scanning surface of fluorescent screen 6 and the reflection surface of reflection means 3, the angle between reflection means 3 and fluorescent screen 6 is nearly 45 degrees.

The diameter of condenser lens 8 is 15 mm (focal distance is also 15 mm). The distance between the optical axis of excitation light source 5 and the fluorescent screen 6 side end of opening 3a of reflection means 3 is denoted by a. When opening 3a of reflection means 3 is viewed from fluorescent screen 6 side along the optical path of excitation light, the width of the region through which excitation light directed from scanning means 4 passes is denoted by c.

If distance a is 10 mm and width c is 9.3 mm, the mirror width of reflection means 3 needs to be 13 mm or greater. Practically, the mirror width of reflection means 3 is around 20 mm. In this case, condenser lens 8 whose diameter ☐ is 15 mm can condense retro-reflection light directed from reflection means 3 on the light reception surface of photo detection means 2.

The change and modification described in the first exemplary embodiment can be applied to the second exemplary embodiment.

Third Exemplary Embodiment

Figure 11:
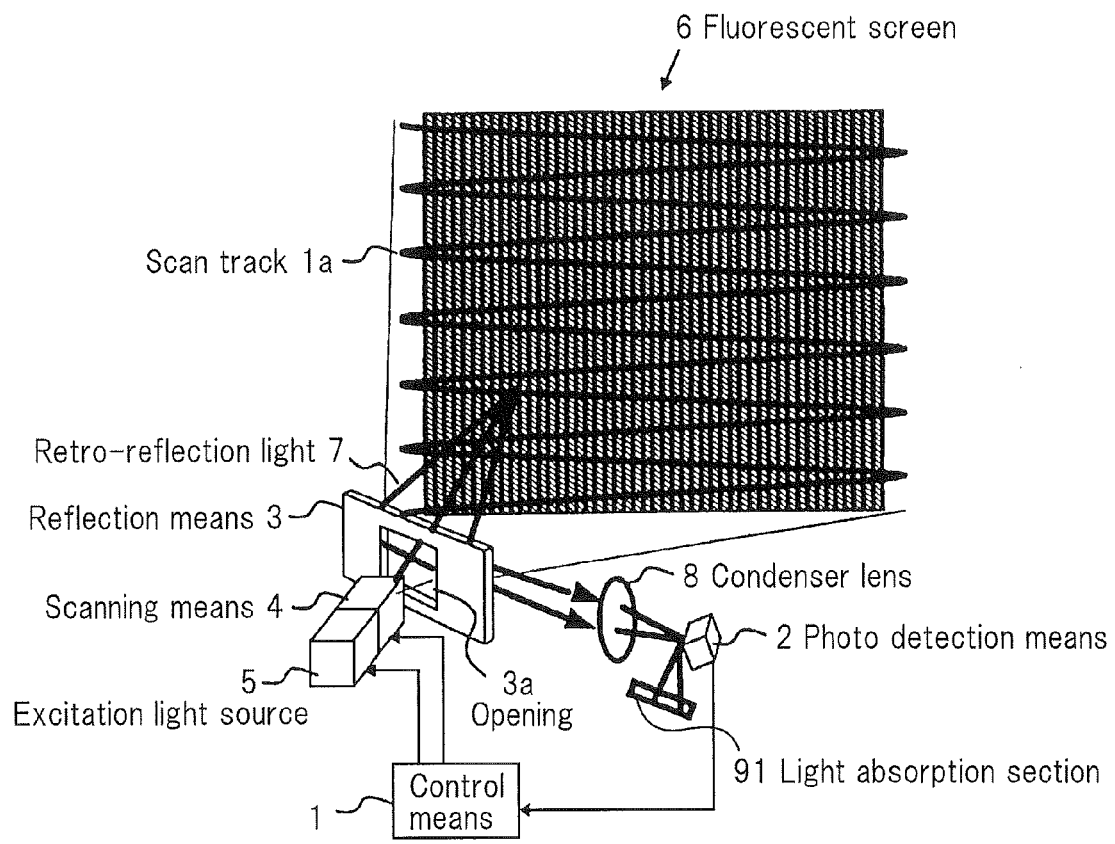
[FIG. 11] is a block diagram showing the structure of an image display device according to a third exemplary embodiment of the present invention.

FIG. 11 is a block diagram showing the structure of an image display device according to a third exemplary embodiment of the present invention.

The structure of the image display device according to the third exemplary embodiment is the same as the structure of the image display device according to the second exemplary embodiment except that photo detection means 2 is located such that the light reception surface intersects with the optical axis of condenser lens 8 with an angle and light absorption section 91 that absorbs light that reflects on the light reception surface is provided.

Besides the effects described in the first and second exemplary embodiments, the image display device according to the third exemplary embodiment can have the following effect.

Part of retro-reflection light (diffusion light) directed from retro-reflective black stripes 64 reflects on reflection means 3 and then enters the light reception surface of photo detection means 2 through condenser lens 8. Part of retro-reflection light that is condensed by condenser lens 8 reflects on the light reception surface of photo detection means 2. Light absorption section 91 is located in the traveling direction of light that reflects on the light reception surface. Thus, most of light that reflects on the light reception surface is absorbed by light absorption section 91.

If photo detection means 2 is located such that its light reception surface is orthogonal to the optical axis of condenser lens 8, light that reflects on the light reception surface enters phosphor regions 61, 62, and 63 and retro-reflective black stripes 64 through condenser lens 8 and reflection means 3. Reflection light that reflects on the light reception surface and then enters phosphor regions 61, 62, and 63 excites phosphors. Reflection light that reflects on the light reception surface and enters retro-reflective black stripes 64 becomes retro-reflection light and then reaches reflection means 3. Part of the light reflects on reflection means 3 and then enters photo detection means 2. Thus, the light that reflects on the light reception surface of photo detection means 2 rather than excitation light directed from scanning means 4 excites phosphors. As a result, color purity and contrast become lower. In addition, if part of retro-reflection light reciprocally travels between retro-reflective black stripes 64 and photo detection means 2, the reciprocally travelled light is superimposed on the output signal of photo detection means 2 as noise. As a result, the detection accuracy of retro-reflection light directed from retro-reflective black stripes 64 becomes lower.

In the image display device according to this embodiment, most of light that reflects on the light reception surface of photo detection means 2 is absorbed by light absorption section 9. Thus, lowering of the foregoing color purity and contrast and the detection accuracy of retro-reflection light directed from retro-reflective black stripes 64 can be prevented.

Likewise, the change and modification of the first exemplary embodiment can be applied to the third exemplary embodiment.

(Fourth Exemplary Embodiment)

Figure 12:
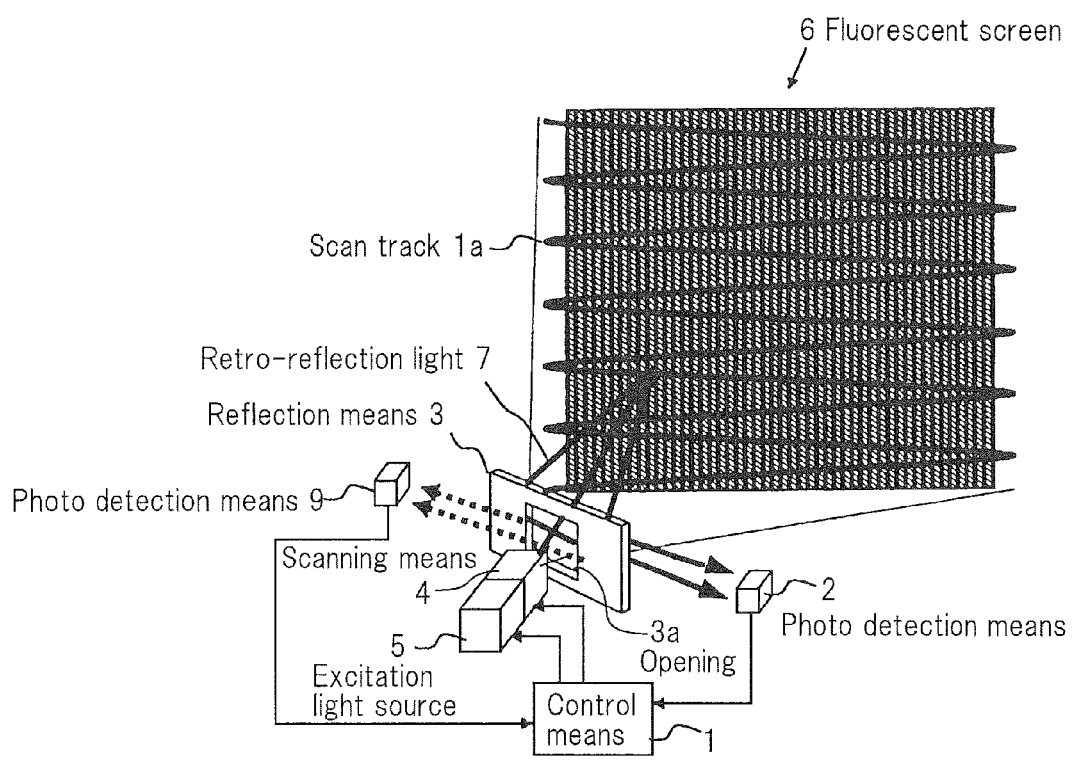
[FIG. 12] is a block diagram showing the structure of an image display device according to a fourth exemplary embodiment of the present invention.

FIG. 12 is a block diagram showing the structure of an image display device according to a fourth exemplary embodiment of the present invention.

The structure of the image display device according to the fourth exemplary embodiment is the same as the structure of the image display device according to the first exemplary embodiment except that the scanning means 4 side surface of reflection means 3 is a reflection surface and photo detection means 9 that receives reflection light that reflects on this reflection surface is provided. An output signal of photo detection means 9 is supplied to control means 1.

Besides the effect described in the first exemplary embodiment, the image display device according to the fourth exemplary embodiment can have the following effect.

The horizontal maximum swing width of scanning means 4 on the reflection surface (scanning means 4 side) of reflection means 3 is greater than the horizontal width of opening 3a of reflection means 3. Thus, when scanning means 4 swings to the extreme left, the left end of opening 3a is irradiated with excitation light directed from scanning means 4. When scanning means 4 swings to the extreme right, the right end of opening 3a is irradiated with excitation light directed from scanning means 4.

The image display device according to this embodiment can adjust the position of reflection means 3 based on the output signal of photo detection means 9. In this case, the image display device is provided with a stage (not shown) that horizontally moves reflection means 3 in the in-plane direction of the plane including the reflection surface of reflection means 3. Control means 1 controls the stage to move based on the output signal of photo detection means 9.

When the position of reflection means 3 is adjusted, control means 1 causes excitation light source 5 to emit light and scanning means 4 to scan fluorescent screen 6 about the optical axis. Thereafter, control means 1 obtains a time width (period) during which the left end of opening 3a is irradiated with excitation light directed from scanning means 4 and a time width (period) during which the right end of opening 3a is irradiated with excitation light directed from scanning means 4. Control means 1 controls the stage that supports reflection means 3 to move such that these time widths match each other.

The position of reflection means 3 is adjusted in the foregoing manner and thereby the optical axis of scanning means 4 can be accurately matched with the center of opening 3a.

Moreover, in the image display device according to this embodiment, the horizontal swing angle of scanning means 4 is controlled using opening 3a of reflection means 3.

Specifically, if a horizontal scanning mirror of scanning means 4 (hereinafter referred to as the horizontal mirror) is a resonance mirror, after control means 1 adjusts the position of reflection means 3, while control means 1 is observing the output signal of photo detection means 9, control means 1 slightly narrows the swing angle of scanning means 4 such that both the left end and right end of opening 3a are irradiated with excitation light based on the output signal of photo detection means 9. Thereafter, control means 1 controls the swing angle of scanning means 4 such that the time width during which the left end of opening 3a is irradiated with excitation light directed from scanning means 4 and the time width during which the right end of opening 3a is irradiated with excitation light directed from scanning means 4 always become constant.

When control means 1 performs the foregoing control, the swing angle of the horizontal mirror of scanning means 4 is restricted to the angle corresponding to the horizontal width of opening 3a, fluorescent screen 6 can be scanned with excitation light such that excessive swinging of the horizontal mirror is suppressed.

If the horizontal mirror of scanning means 4 is other than a resonance mirror, the horizontal swing angle of the horizontal mirror can be controlled in the following manner. Specifically, control means 1 controls scanning means 4 to swing excitation light in the left direction. When the left end of opening 3a is irradiated with part of excitation light directed from scanning means 4, the part of excitation light reflects at the left end. The reflection light that reflects at the left end is detected by photo detection means 9. Control means 1 detects that the left end of opening 3a is irradiated with the part of excitation light based on the output signal of photo detection means 9.

When control means 1 detects that the left end is irradiated with part of excitation light, control means 1 controls scanning means 4 to swing excitation light in the right direction. When the right end of opening 3a is irradiated with part of excitation light directed from scanning means 4, the part of excitation light reflects at the right end. The reflection light that reflects at the right end is detected by photo detection means 9. Control means 1 detects that the right end is irradiated with part of excitation light based on the output signal of photo detection means 9.

When control means 1 detects that the right end is irradiated with part of excitation light, control means 1 controls scanning means 4 to swing excitation light in the left direction. Thereafter, control means 1 controls scanning means 4 to swing excitation light in the left and right directions.

When control means 1 controls scanning means 4 in the foregoing manner, since the swing angle of the horizontal mirror of scanning means 4 is restricted to the angle corresponding to the horizontal width of opening 3a, excessive swinging of the horizontal mirror can be prevented.

The angle of the reflection surface of reflection means 3 to the optical axis of scanning means 4 and the distance between reflection means 3 and scanning means 4 can be adequately set such that the reflection light that reflects at the left and right ends is detected by photo detection means 9.

In the image display device according to this embodiment, besides the swing angle of the horizontal mirror, the swing angle of a vertical scanning mirror of scanning means 4 (hereinafter this mirror is referred to as the vertical mirror) can be controlled using opening 3a of reflection means 3.

Specifically, control means 1 controls scanning means 4 to swing excitation light in the upper direction. When the upper end of opening 3a is irradiated with part of excitation light directed from scanning means 4, the part of excitation light reflects at the upper end. The reflection light that reflects at the upper end is detected by photo detection means 9. Control means 1 detects that the upper end is irradiated with part of excitation light based on the output signal of photo detection means 9.

When control means 1 detects that the upper end is irradiated with part of excitation light, control means 1 controls scanning means 4 to swing excitation light in the lower direction. When the lower end of opening 3a is irradiated with part of excitation light directed from scanning means 4, the part of the excitation light reflects at the lower end. The reflection light that reflects at the lower end is detected by photo detection means 9. Control means 1 detects that the lower end is irradiated with part of excitation light based on the output signal of photo detection means 9.

When control means 1 detects that the lower end is irradiated with part of excitation light, control means 1 controls scanning means 4 to swing excitation light in the upper direction. Thereafter, control means 1 controls scanning means 4 to swing excitation light in the upper and lower directions (vertical direction).

Alternatively, photo detection means 9 may be composed of two or more PDs (photodiodes). If photo detection means 9 is composed of two PDs, one PD may be located at the position where reflection light that reflects at the left end of reflection means 3 is received and the other PD is located at the position where reflection light that reflects at the right end of reflection means 3 is received. Control means 1 controls the swing angle of the horizontal mirror based on the output signals of the PDs. If photo detection means 9 is composed of four PDs, besides the left and right detection PDs, one of the other PDs may be located at the position where reflection light that reflects at the upper end of reflection means 3 is received and the other one may be located at the position where reflection light that reflects at the lower end of reflection means 3 is received.

When control means 1 controls scanning means 4 in the foregoing manner, since the swing angle of the vertical mirror of scanning means 4 is restricted to the angle corresponding to the vertical width of reflection means 3a, excessive swinging of the vertical mirror can be prevented.

Thus, with at least one photo detection means 9, excessive swinging of scanning means 4 can be prevented in a maximum of four directions of upper, lower, left, and right directions.

(Fifth Exemplary Embodiment)

Figure 13:
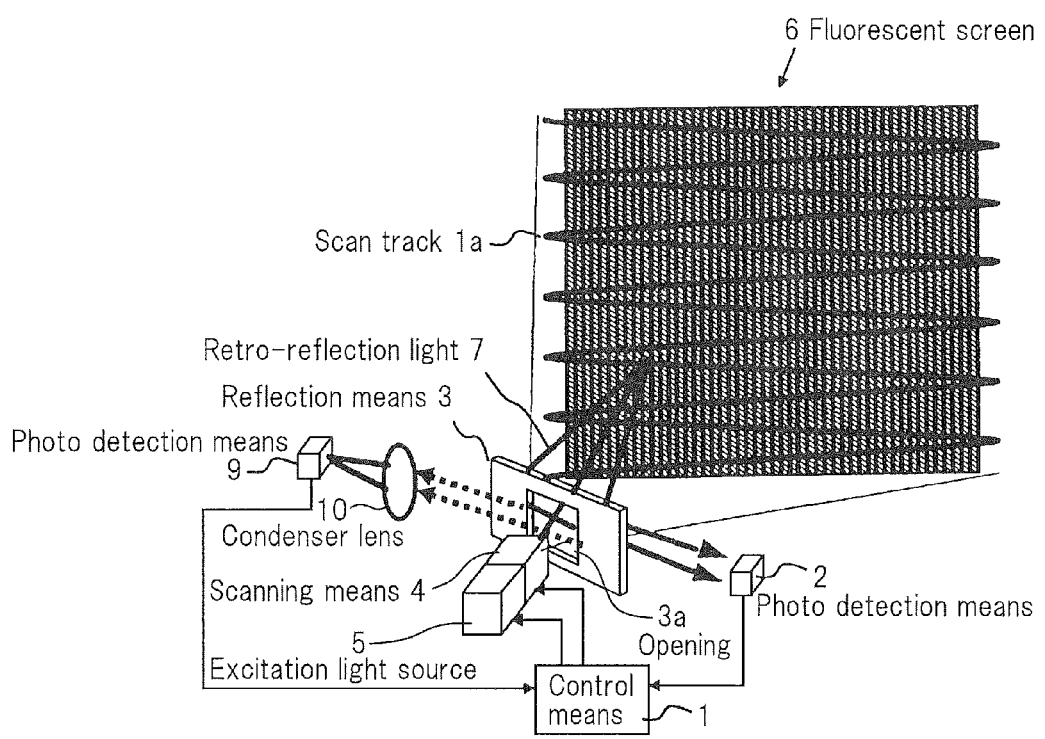
[FIG. 13] is a block diagram showing the structure of an image display device according to a fifth exemplary embodiment of the present invention.

FIG. 13 is a block diagram showing the structure of an image display device according to a fifth exemplary embodiment of the present invention.

The structure of the image display device according to the fifth exemplary embodiment is the same as the structure of the image display device according to the fourth exemplary embodiment except that condenser lens 10 is located to face the light reception surface of photo detection means 9.

Besides the effects described in the first to fourth exemplary embodiments, the image display device according to the fifth exemplary embodiment can have the following effect.

Condenser lens 10 condenses reflection light that reflects at the left and right ends of opening 3a of reflection means 3 on the light reception surface of photo detection means 9. Thus, with respect to reflection light that reflects at the left and right ends, the ratio of reflection light that enters photo detection means 9 becomes large and thereby the detection accuracy improves.

Since condenser lens 10 is provided, the size of the light reception surface of photo detection means 9 can be decreased and photo detection means 9 can be miniaturized. As a result, the response speed of photo detection means 9 can be improved.

(Sixth Exemplary Embodiment)

Figure 14:
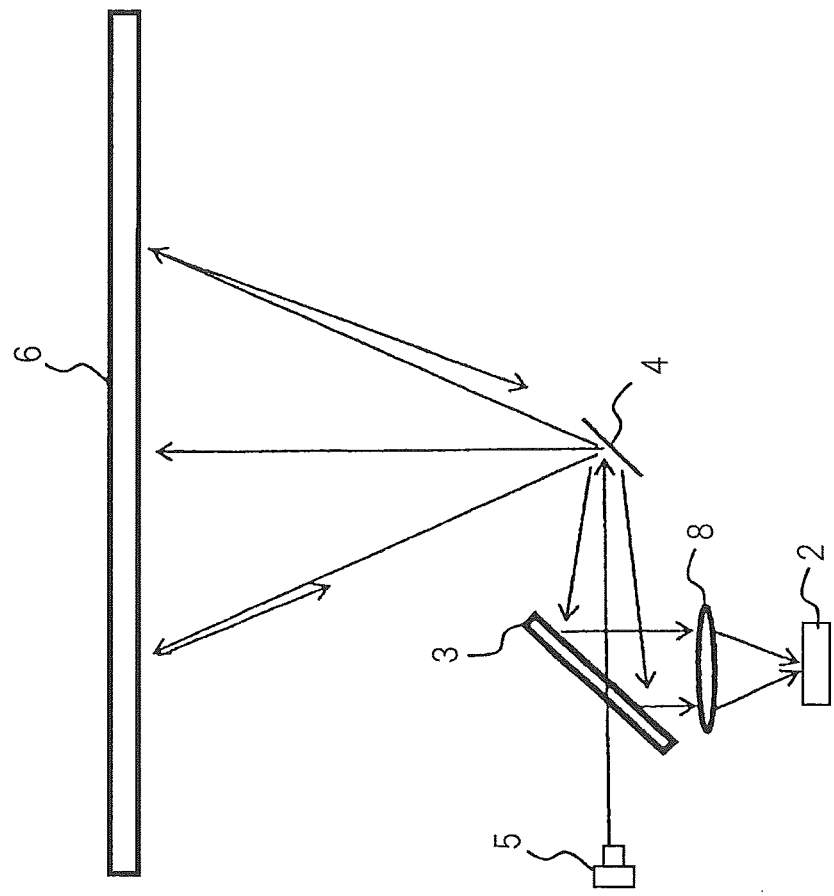
[FIG. 14] is a block diagram showing the structure of an image display device according to a sixth exemplary embodiment of the present invention.

FIG. 14 is a block diagram showing the structure of an image display device according to a sixth exemplary embodiment of the present invention.

The structure of the image display device according to the sixth exemplary embodiment is basically the same as the structure of the image display device according to the first exemplary embodiment except for the position and shape of reflection means 3.

As shown in FIG. 14, reflection means 3 is located between excitation light source 5 and scanning means 4. Scanning means 4 is a two-axis scanning mirror typified by an MEMS mirror. Alternatively, instead of a two-axis scanning mirror, a combination of a first scanning mirror that scans fluorescent screen 6 in the horizontal direction and a second scanning mirror that scans fluorescent screen 6 in the vertical direction may be used.

Figure 15:
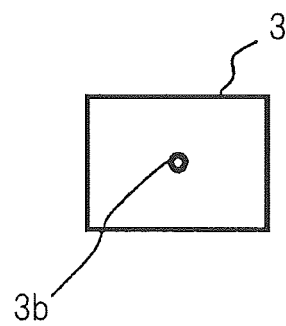
[FIG. 15] is a schematic diagram describing the shape of reflection means of the image display device shown in FIG. 14.

FIG. 15 is a schematic diagram showing the shape of reflection means 3. As shown in FIG. 15, point-shaped opening 3b, for example, circular opening 3b is formed at the center of reflection means 3. Excitation light emitted from excitation light source 5 passes through opening 3b of reflection means 3 and then reaches scanning means 4. The diameter of opening 3b is equal to or greater than the diameter of excitation light emitted from excitation light source 5 (beam diameter).

Retro-reflection light directed from retro-reflective black stripes 64 of fluorescent screen 6 reaches reflection means 3 through scanning means 4. Part of retro-reflection light reflects on reflection means 3. The reflection light that reflects on reflection means 3 is condensed by condenser lens 8 on the light reception surface of photo detection means 2. If scanning means 4 is a two-axis scanning mirror having a large mirror size, reflection means 3 can reflect more retro-reflection light and then condenser lens 8 can condense the retro-reflection light on the light reception surface of photo detection means 2.

The image display device according to this embodiment can have the same effects as does the first to third exemplary embodiments.

(Seventh Exemplary Embodiment)

Figure 16:
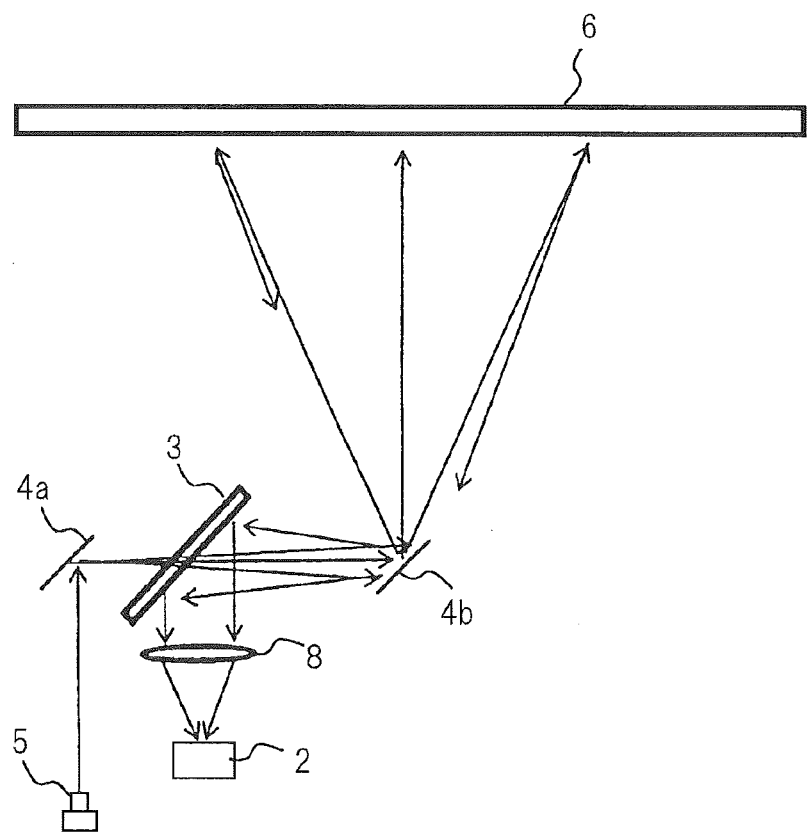
[FIG. 16] is a block diagram showing the structure of an image display device according to a seventh exemplary embodiment of the present invention.

FIG. 16 is a block diagram showing the structure of an image display device according to a seventh exemplary embodiment of the present invention.

The structure of the image display device according to the seventh exemplary embodiment is basically the same the structure of the image display device according to the first exemplary embodiment except for the position and shape of reflection means 3.

As shown in FIG. 16, scanning mirror 4a that scans fluorescent screen 6 in the horizontal direction is located in the traveling direction of excitation light emitted from excitation light source 5. Scanning mirror 4b that scans fluorescent screen 6 in the vertical direction is located in the traveling direction of excitation light that reflects on scanning mirror 4a. Reflection means 3 is located between scanning mirror 4a and scanning mirror 4b.

Figure 17:
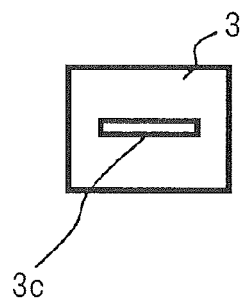
[FIG. 17] is a schematic diagram describing the shape of reflection means of the image display device shown in FIG. 16.

FIG. 17 is a schematic diagram showing the shape of reflection means 3. As shown in FIG. 17, linear opening 3c is formed at the center of reflection means 3. Excitation light directed from scanning mirror 4a passes through opening 3c of reflection means 3 and then reaches scanning mirror 4a. The length of linear opening 3c is decided depending on the horizontal swing width of scanning mirror 4a.

Retro-reflection light directed from retro-reflective black stripes 64 of fluorescent screen 6 reaches reflection means 3 through scanning mirror 4b. Part of the retro-reflection light reflects on reflection means 3. The reflection light that reflects on reflection means 3 is condensed by condenser lens 8 on the light reception surface of photo detection means 2. If scanning mirror 4b is a polygon mirror having a large mirror size, reflection means 3 can reflect more retro-reflection light and then condenser lens 8 can condense the retro-reflection light on the light reception surface of photo detection means 2.

The image display device according to this embodiment can have the same effect as does the first exemplary embodiment.

The image display device according to this embodiment can be applied to any of the first to fifth exemplary embodiments.

If reflection means 3 is used to control the horizontal swing angle as described in the fourth and fifth exemplary embodiments, a reflection surface is formed on the scanning mirror 4a side surface of reflection means 3. Photo detection means 9 is located to face the scanning mirror 4a side surface of reflection means 3. In this case, condenser lens 10 may be located to face the light reception surface of photo detection means 9.

(Eighth Exemplary Embodiment)

Figure 18:
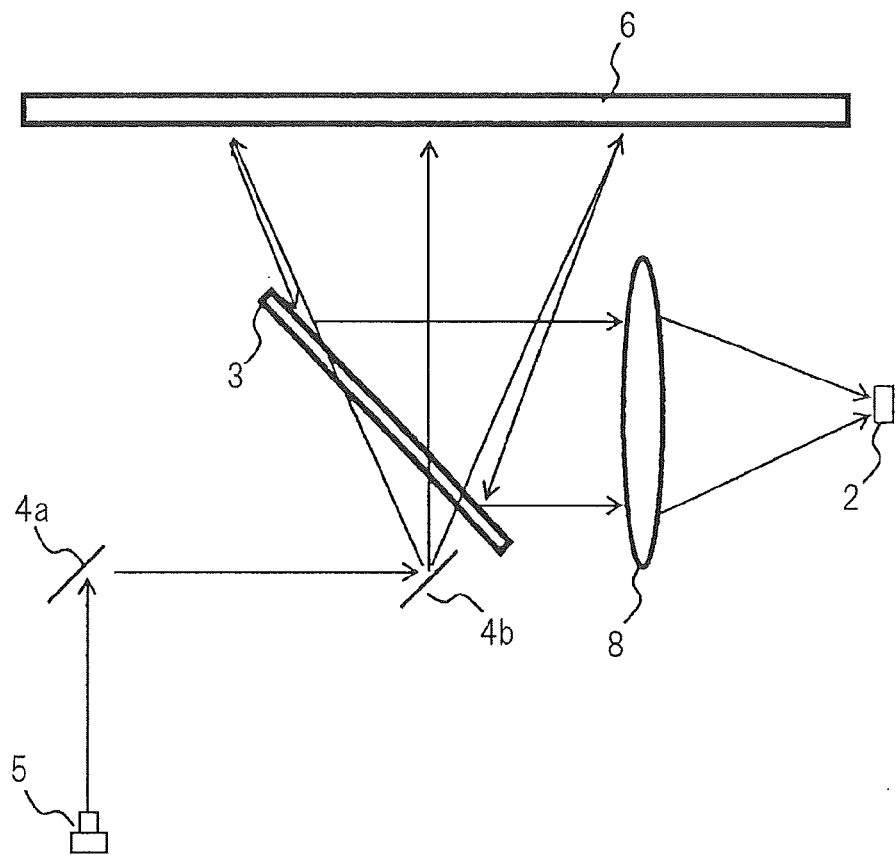
[FIG. 18] is a block diagram showing the structure of an image display device according to an eighth exemplary embodiment of the present invention.

FIG. 18 is a block diagram showing the structure of an image display device according to an eighth exemplary embodiment of the present invention.

The structure of the image display device according to the eighth exemplary embodiment is basically the same as the structure of the image display device according to the second exemplary embodiment except that the scanning means is composed of scanning mirror 4a that scans fluorescent screen 6 in the horizontal direction and scanning mirror 4b that scans fluorescent screen 6 in the vertical direction.

As shown in FIG. 18, scanning mirror 4a that scans fluorescent screen 6 in the horizontal direction is located in the traveling direction of excitation light emitted from excitation light source 5. Scanning mirror 4b that scans fluorescent screen 6 in the vertical direction is located in the traveling direction of excitation light that reflects on scanning mirror 4a. Reflection means 3 is located between scanning mirror 4b and fluorescent screen 6.

Figure 19:
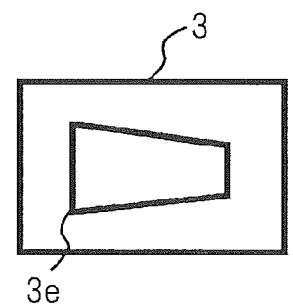
[FIG. 19] is a schematic diagram describing another shape of reflection means of the image display device shown in FIG. 18.

FIG. 19 is a schematic diagram showing another shape of reflection means 3. As shown in FIG. 19, trapezoidal opening 3e is formed at the center of reflection means 3. For example, as is clear from scan track 1a shown in FIG. 9, the scanning range of scanning mirror 4a and scanning mirror 4b on fluorescent screen 6, which is scanned with excitation light, is trapezoidal. The size and shape of opening 3e are decided such that opening 3e becomes similar to the trapezoidal scanning range.

Retro-reflection light directed from retro-reflective black stripes 64 of fluorescent screen 6 reaches reflection means 3. Part of the retro-reflection light reflects on reflection means 3. The reflection light that reflects on reflection means 3 is condensed by condenser lens 8 on the light reception surface of photo detection means 2.

The image display device according to the eighth exemplary embodiment can have the same effect as does the second exemplary embodiment.

The image display device according to the eighth exemplary embodiment can be applied to any of the first to fifth exemplary embodiments.

When reflection means 3 is used to control the horizontal swing angle as described in the fourth and fifth exemplary embodiments, a reflection surface is formed on the scanning mirror 4b side surface of reflection means 3. Photo detection means 9 is located to face the scanning mirror 4b side surface of reflection means 3. In this case, condenser lens 10 may be located to face the light reception surface of photo detection means 9.

The image display device according to each of the foregoing embodiments is just an example of the present invention. The structure and operation of the image display device may be changed without departing from the scope of the present invention.

For example, two or more structures of those according to the first to eight exemplary embodiments may be combined. Specifically, the structure of the second exemplary embodiment and at least one of the structures of the fourth and fifth exemplary embodiments may be combined. Alternatively, the structure of the third exemplary embodiment and at least one of the structures of the fourth and fifth exemplary embodiments may be combined.

In the image display device according to each of the foregoing embodiments, the retro-reflective black stripes are vertical stripes. Alternatively, horizontal stripes (retro-reflective horizontal black stripes) or matrix-shaped stripes (retro-reflective black matrix) may be used. The retro-reflective horizontal black stripes are formed by rotating the retro-reflective vertical black stripes by around 90 degrees while the screen surface is fixed. The retro-reflective black matrix is composed of a combination of retro-reflective vertical stripes and retro-reflective horizontal stripes. When these stripes are used, retro-reflective horizontal stripes or black matrix are scanned such that excitation light diagonally traverse them. Control means 1 detects the boundaries between retro-reflective horizontal black stripes or black matrix and phosphor regions based on the output signal of the photo detection means.

Reflection means 3 may be located at any position on an optical path of excitation light between excitation light source 5 and fluorescent screen 6. Specifically, when reflection means 3 is viewed from fluorescent screen 6 side along the optical path of excitation light, reflection means 3 may be located in such a manner that it surrounds or sandwiches the region through which excitation light passes.

In the foregoing case, reflection means 3 is composed of a plurality of reflection members that surround a region through which excitation light passes. The reflection members may be located at different positions on the optical path of excitation light. For example, reflection means 3 may be composed of first and second reflection members that extend in the direction that is orthogonal to or intersects with the horizontal direction and a third reflection member (or third and fourth reflection members) that extends in the direction orthogonal to the first and second reflection members. These reflection members may be located at different positions on the optical path of the excitation light.

Alternatively, the plurality of reflection members may be divided into a plurality of groups containing at least one reflection member. The groups may be located at different positions on the optical path of excitation light. For example, reflection means 3 may be composed of first and second reflection members that extend in the direction that is orthogonal to or intersects with the horizontal direction and a third reflection member (or third and fourth reflection members) that extends in the direction orthogonal to the first and second reflection members. These reflection members may be divided into a plurality of groups containing at least one reflection member. These groups may be located at different positions on the optical path of excitation light. For example, if reflection means 3 includes first to fourth reflection members, the group of the first and second reflection members and the group of the third and fourth reflection members may be located at different positions on the optical path of excitation light. Alternatively, the group of the first and third reflection members and the group of the second and fourth reflection members may be located at different positions on the optical path of excitation light.

Photo detection means 2 and photo detection means 9 may be composed of a filter that transmits only excitation light and a photodiode. When a filter that transmits only excitation light is used, visible fluorescent components directed from phosphor regions 61, 62, and 63 and external light component and stray light component emitted from the fluorescent screen are prevented from entering a photodiode and becoming noise. In addition, the S/N ration can be further increased.

The reflection surface of reflection means 3, which reflects retro-reflection light directed from retro-reflective black stripes 64, may be formed in a concave shape. More specifically, the concave shaped surface causes part of retro-reflection light directed from retro-reflective black stripes 64 to be condensed on the light reception surface of photo detection means 2.

In addition, fluorescent screen 6 side surface of reflection means 3, which reflects retro-reflection light directed from retro-reflective black stripes 64, and the scanning means 4 side surface of reflection means 3 may be formed in a non-spherical shape that causes part of retro-reflection light to be condensed on the light reception surface of photo detection means 2 or photo detection means 9. This non-spherical shape may be applied to the foregoing concave surface.

With reference to the embodiments, the present invention has been described. However, it should be understood by those skilled in the art that the structure and details of the present invention may be changed in various manners without departing from the scope of the present invention.

The present application claims a priority based on Japanese Patent Application JP 2011-043854 filed on Mar. 1, 2011, the entire contents of which are incorporated herein by reference in its entirety.

The invention claimed is:

1. An image display device, comprising:
    an excitation light source;
    a fluorescent screen that includes a plurality of phosphor regions which are repeatedly formed in an in-plane direction and a retro-reflection region that reflects a part of light that enters the retro-reflection region in a direction opposite to a direction of the light;
    a scanning unit that scans a surface of said fluorescent screen on which said phosphor regions and said retro-reflection region are formed with excitation light emitted from said excitation light source;
    a photo detection unit that outputs a signal value that varies on the basis of a quantity of light that enters said photo detection unit;
    a reflection unit that reflects retro-reflection light of the excitation light directed from said retro-reflection region to said photo detection unit; and
    a control unit that causes said scanning unit to scan said fluorescent screen, detects boundaries between said phosphor regions and said retro-reflection region on said fluorescent screen based on the output signal of said photo detection unit, and controls a light emission timing of said excitation light source based on the detected boundaries,
    wherein said reflection unit surrounds or sandwiches a region through which said excitation light passes when said reflection unit is viewed from said fluorescent screen side along an optical path of said excitation light.

2. The image display device as set forth in claim 1, wherein said reflection unit is located between said scanning unit and said fluorescent screen and includes a planar opening through which said excitation light directed from said scanning unit passes.

3. The image display device as set forth in claim 2, further comprising:
    a second photo detection unit that outputs a signal whose value varies corresponding to a quantity of light that enters said second photo detection unit,
    wherein said second reflection unit includes, on a surface opposite to a surface on which a reflection surface that reflects said retro-reflection light directed from said retro-reflection region is formed, a second reflection surface that reflects a part of said excitation light emitted from said excitation light source toward said second photo detection unit, and wherein said control unit controls a swing angle in a predetermined scanning direction of said scanning unit based on the signal that is output from said second photo detection unit.

4. The image display device as set forth in claim 3, further comprising:
a condenser lens that condenses, on a light reception surface of said second photo detection unit, light that reflects on said second reflection surface.

5. The image display device as set forth in claim 3, wherein said second reflection surface comprises a curved surface, which comprises a concave surface or a non-spherical surface, or a surface which is formed by combining said concave surface with said non-spherical surface.

6. The image display device as set forth in claim 1, wherein said scanning unit includes:
a first scanning mirror that scans said fluorescent screen in a first direction with said excitation light emitted from said excitation light source; and
a second scanning mirror that scans said fluorescent screen in a second direction orthogonal to said first direction with said excitation light directed from said first scanning minor, and
wherein said reflection unit is located between said first and second scanning mirrors.

7. The image display device as set forth in claim 6, wherein said reflection unit includes a linear opening through which said excitation light directed from said first scanning mirror passes.

8. The image display device as set forth in claim 6, wherein said reflection unit includes first and second reflection members that extend in a direction orthogonal to the scanning direction of said first scanning mirror, and
wherein the first and second reflection members are located to sandwich a region through which said excitation light passes.

9. The image display device as set forth in claim 6, further comprising:
a second photo detection unit that outputs a signal whose value varies corresponding to a quantity of light that enters said second photo detection unit;
wherein said reflection unit includes, on a surface opposite to a surface on which a reflection surface that reflects said retro-reflection light directed from said retro-reflection region is formed, a second reflection surface that reflects a part of said excitation light emitted from said excitation light source toward said second photo detection unit, and
wherein said control unit controls a swing angle in a predetermined scanning direction of said scanning unit based on the signal that is output from said second photo detection unit.

10. The image display device as set forth in claim 9, further comprising:
a condenser lens that condenses, on a light reception surface of said second photo detection unit, light that reflects on said second reflection surface.

11. The image display device as set forth in claim 9, wherein said second reflection surface comprises a curved surface, which comprises a concave surface or a non-spherical surface, or a surface which is formed by combining said concave surface with said non-spherical surface.

12. The image display device as set forth in claim 1, wherein said scanning unit includes:
a first scanning minor that scans said fluorescent screen in a first direction with said excitation light emitted from said excitation light source; and
a second scanning mirror that scans said fluorescent screen in a second direction orthogonal to said first direction with said excitation light directed from said first scanning minor,
wherein said reflection unit is located between said second scanning mirror and said fluorescent screen and includes first and second reflection members that extend in a direction orthogonal to the scanning direction of said first scanning mirror, and
wherein the first and second reflection members are located to sandwich a region through which said excitation light passes.

13. The image display device as set forth in claim 12, further comprising:
a second photo detection unit that outputs a signal whose value varies corresponding to a quantity of light that enters said second photo detection unit,
wherein said reflection unit includes, on a surface opposite to a surface on which a reflection surface that reflects said retro-reflection light directed from said retro-reflection region is formed, a second reflection surface that reflects a part of said excitation light emitted from said excitation light source toward said second photo detection unit, and
wherein said control unit controls a swing angle in a predetermined scanning direction of said scanning unit based on the signal that is output from said second photo detection unit.

14. The image display device as set forth in claim 13, further comprising:
a condenser lens that condenses, on a light reception surface of said second photo detection unit, light that reflects on said second reflection surface.

15. The image display device as set forth in claim 13, wherein said second reflection surface comprises a curved surface, which comprises a concave surface or a non-spherical surface, or a surface which is formed by combining said concave surface with said non-spherical surface.

16. The image display device as set forth in claim 1, wherein said reflection unit is located between said excitation light source and said scanning unit.

17. The image display device as set forth in claim 16, wherein said scanning unit includes a point-shaped opening through which said excitation light emitted from said excitation light source passes.

18. The image display device as set forth in claim 1, wherein said scanning unit includes:
a first scanning mirror that scans said fluorescent screen in a first direction with said excitation light emitted from said excitation light source; and
a second seaming mirror that scans said fluorescent screen in a second direction orthogonal to said first direction with said excitation light directed from said first scanning mirror, and
wherein said reflection unit includes:
a first reflection member that extends in a direction orthogonal to the scanning direction of said first scanning mirror; and a second reflection member that extends in the scanning direction of said first scanning mirror.

19. The image display device as set forth in claim 1, wherein said scanning unit includes:
a first scanning mirror that scans said fluorescent screen in a first direction with said excitation light emitted from said excitation light source; and
a second scanning mirror that scans said fluorescent screen in a second direction orthogonal to said first direction with said excitation light directed from said first scanning mirror,
wherein said reflection unit includes:
first and second reflection members that extend in a direction orthogonal to the scanning direction of said first scanning mirror; and
a third reflection member that extends in the scanning direction of said first scanning mirror, and
wherein said first to third reflection members are located to surround a region through which said excitation light passes when said first to third reflection members are viewed from said fluorescent screen side.

20. The image display device as set forth in claim 19, wherein the individual reflection members that compose said reflection unit are located at different positions on the optical path of said excitation light.

21. The image display device as set forth in claim 19, wherein the individual reflection members that compose said reflection unit are divided into a plurality of groups, each group including at least one reflection member, and the individual groups are located at different positions on the optical path of said excitation light.

22. The image display device as set forth in claim 1, wherein said scanning unit includes:
a first scanning mirror that scans said fluorescent screen in a first direction with said excitation light emitted from said excitation light source; and
a second scanning mirror that scans said fluorescent screen in a second direction orthogonal to said first direction with said excitation light directed from said first scanning mirror,
wherein said reflection unit includes:
first and second reflection members that extend in a direction orthogonal to the scanning direction of said first scanning mirror; and
third and fourth reflection members that extend in the scanning direction of said first scanning mirror, and
wherein said first to fourth reflection members are located to surround a region through which said excitation light passes when said first to third reflection members are viewed from said fluorescent screen side.

23. The image display device as set forth in claim 22, wherein the individual reflection members that compose said reflection unit are located at different positions on the optical path of said excitation light.

24. The image display device as set forth in claim 22, wherein the individual reflection members that compose said reflection unit are divided into a plurality of groups, each group including at least one reflection member, and the individual groups are located at different positions on the optical path of said excitation light.

25. The image display device as set forth in claim 1, wherein said retro-reflection region is formed between the individual phosphor regions of said fluorescent screen.

26. The image display device as set forth in claim 1, further comprising:
a condenser lens that condenses said retro-reflection light directed from said reflection unit on a light reception surface of said photo detection unit.

27. The image display device as set forth in any claim 1, wherein a reflection surface of said reflection unit that reflects said retro-reflection light directed from said retro-reflection region is a curved surface, which is a concave surface or a non-spherical surface, or a surface which is formed by combining said concave surface with said non-spherical surface.

\* \* \* \* \*